United States Patent
Huang et al.

(10) Patent No.: US 11,533,606 B2
(45) Date of Patent: Dec. 20, 2022

(54) METHOD AND APPARATUS FOR MANAGING MOBILITY PATTERN OF TERMINAL

(71) Applicant: Huawei Technologies Co., Ltd., Guangdong (CN)

(72) Inventors: Zhenglei Huang, Beijing (CN); Yanmei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 16/283,324

(22) Filed: Feb. 22, 2019

(65) Prior Publication Data
US 2019/0191297 A1    Jun. 20, 2019

Related U.S. Application Data

(63) Continuation of application No. PCT/CN2016/096443, filed on Aug. 23, 2016.

(51) Int. Cl.
*H04W 36/32*    (2009.01)
*H04W 8/20*    (2009.01)
(Continued)

(52) U.S. Cl.
CPC ............... *H04W 8/20* (2013.01); *H04W 8/24* (2013.01); *H04W 24/02* (2013.01);
(Continued)

(58) Field of Classification Search
CPC ....... H04W 8/20; H04W 24/02; H04W 76/27; H04W 36/125; H04W 8/24; H04W 36/32; H04W 36/0016; H04W 8/08
See application file for complete search history.

(56) References Cited

U.S. PATENT DOCUMENTS

2003/0224804 A1    12/2003    Liu
2004/0224669 A1*    11/2004    Pedlar ............... H04W 76/27
                                                            455/412.1
(Continued)

FOREIGN PATENT DOCUMENTS

CN    1446002 A    10/2003
CN    104871608 A    8/2015
(Continued)

OTHER PUBLICATIONS

"3rd Generation Partnership Project; Technical Specification Group Core Network and Terminals; Non-Access-Stratum (NAS) protocol for Evolved Packet System (EPS); Stage 3 (Release 14)," 3GPP TS 24.301 V14.0.1 (Jun. 2016), 452 pages.
(Continued)

*Primary Examiner* — Gregory B Sefcheck
*Assistant Examiner* — Joshua Smith
(74) *Attorney, Agent, or Firm* — Slater Matsil, LLP

(57) ABSTRACT

A method and an apparatus for managing a mobility pattern of a terminal are disclosed, to flexibly configure and manage a mobility pattern of a terminal based on an actual application scenario of the terminal, and optimize network performance. The method is: obtaining, by a control plane function (CPF) entity, mobility pattern related information of a terminal; determining, by the CPF entity, a first mobility pattern of the terminal based on the mobility pattern related information of the terminal; and sending, by the CPF entity, the determined first mobility pattern to a radio access network (RAN) node, where the first mobility pattern is used by the RAN node to determine a second mobility pattern of the terminal.

16 Claims, 9 Drawing Sheets

(51) Int. Cl.
*H04W 24/02* (2009.01)
*H04W 76/27* (2018.01)
*H04W 36/12* (2009.01)
*H04W 8/24* (2009.01)
*H04W 36/00* (2009.01)

(52) U.S. Cl.
CPC ......... *H04W 36/125* (2018.08); *H04W 36/32* (2013.01); *H04W 76/27* (2018.02); *H04W 36/0016* (2013.01)

(56) References Cited

U.S. PATENT DOCUMENTS

| | | | |
|---|---|---|---|
| 2008/0031194 A1* | 2/2008 | Yaqub | H04W 12/04 370/331 |
| 2009/0176513 A1* | 7/2009 | Bosch | H04W 8/08 455/458 |
| 2010/0323704 A1* | 12/2010 | Tailor | H04W 36/32 455/438 |
| 2013/0122892 A1* | 5/2013 | Morioka | H04W 88/04 455/422.1 |
| 2013/0194941 A1* | 8/2013 | Lu | H04W 76/27 370/252 |
| 2013/0203415 A1* | 8/2013 | Arvidsson | H04W 8/16 455/435.1 |
| 2014/0185465 A1 | 7/2014 | Balachandran et al. | |
| 2014/0301288 A1* | 10/2014 | Koc | H04W 36/30 370/329 |
| 2015/0036663 A1* | 2/2015 | Kilpatrick, II | H04W 36/0083 370/332 |
| 2015/0038180 A1 | 2/2015 | Quick, Jr. et al. | |
| 2015/0173017 A1* | 6/2015 | Rakotoharison | H04W 52/0222 370/311 |
| 2015/0230166 A1 | 8/2015 | Casati et al. | |
| 2015/0264554 A1* | 9/2015 | Addepalli | H04L 43/0858 370/328 |
| 2015/0282082 A1* | 10/2015 | Landais | H04W 76/27 370/311 |
| 2015/0304955 A1* | 10/2015 | Manepalli | H04W 76/28 370/311 |
| 2016/0150494 A1* | 5/2016 | Tabet | H04L 5/0098 370/350 |
| 2016/0157207 A1 | 6/2016 | Knauft et al. | |
| 2016/0286441 A1* | 9/2016 | Kweon | H04W 36/0066 |
| 2017/0169356 A1* | 6/2017 | Dousse | H04W 8/245 |

FOREIGN PATENT DOCUMENTS

| | | |
|---|---|---|
| CN | 104980959 A | 10/2015 |
| CN | 105027649 A | 11/2015 |
| CN | 105432118 A | 3/2016 |
| EP | 2725852 A1 | 4/2014 |
| JP | 2016500974 A | 1/2016 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 14)," 3GPP TS 23.401 V14.0.0 (Jun. 2016), 374 pages.

"3rd Generation Partnership Project; Technical Specification Group Services and System Aspects; Study on Architecture for Next Generation System(Release 14)," 3GPP TR 23.799 V0.7.0 (Aug. 2016), 322 pages.

* cited by examiner

METHOD AND APPARATUS FOR MANAGING MOBILITY PATTERN OF TERMINAL

CROSS-REFERENCE TO RELATED APPLICATIONS

This application is a continuation of International Application No. PCT/CN2016/096443, filed on Aug. 23, 2016, the disclosure of which is hereby incorporated by reference in its entirety.

TECHNICAL HELD

This application relates to the field of communications technologies, and in particular, to a method and an apparatus for managing a mobility pattern of a terminal.

BACKGROUND

In a 5th generation (5G) communications system, a connection status of a terminal may include a signaling connection status and a session connection status. The signaling connection status includes a non-access stratum (NAS) signaling connection management (CM) status and a radio resource control (RRC) signaling connection management status. The NAS signaling connection management status may be indicated by NCM and used to indicate an establishment status of a NAS signaling connection between the terminal and a core network, such as states NCM_IDLE and NCM_CONNECTED. The NCM_IDLE indicates that no signaling connection is established between the terminal and the core network. The NCM_CONNECTED indicates that a signaling connection is already established between the terminal and the core network by using a RAN node. The RRC signaling connection management status is used to indicate an establishment status of an RRC signaling connection between the terminal and a radio access network, such as states RRC_IDLE, RRC_CONNECTED, RRC_INACTIVE, and RRA_PCH. The RRC_IDLE indicates that no RRC connection is established between the terminal and a RAN node. The RRC_CONNECTED indicates that an RRC connection is already established between the terminal and a RAN node. The RRC_INACTIVE indicates that a RAN node still stores information of the terminal such as an RRC context and a bearer context after a data packet is sent. An RRA identities coverage of a. RAN node, and the RRA_PCH indicates that the terminal is in an idle state in which the network pages the terminal in only the RRA coverage.

A session connection management status is used to indicate an activation status of a session context between the terminal and the network and includes states such as SESSION CONTEXT ACTIVE, SESSION CONTEXT INACTIVE, and SESSION CONTEXT SUSPEND. The SESSION CONTEXT ACTIVE indicates that the session context is in an active state. In other words, the session context is already stored. The SESSION CONTEXT INACTIVE indicates that the session context is in an inactive state. In other words, the session context is already deleted. The SESSION CONTEXT SUSPEND indicates that the session context is stored but no data receiving or sending is performed.

For the signaling connection status, different signaling connection states indicate reachability levels of a terminal location, namely, terminal location precision that can be determined by the core network. For example, when the terminal is in the NCM_IDLE state, it indicates that no signaling connection is established between the terminal and the core network, and the terminal location precision that can be determined by the core network is a location area range preallocated by the core network to the terminal. The location area range includes coverage of a plurality of radio access network (RAN) nodes. When the terminal is in the NCM_CONNECTED state, it indicates that the signaling connection is already established between the terminal and the core network by using a RAN node, and the terminal location accuracy that can be determined by the core network is coverage of the RAN node. When there is downlink data, if the terminal is in the NCM_IDLE state, the core network needs to page the terminal by using a plurality of RAN nodes in a location area range in which the terminal is located, so as to send the data to the terminal. In this case, paging overheads are caused. When the terminal is in the NCM_CONNECTED state, the core network may directly send the data to a RAN node in which the terminal is currently located, and does not need to perform paging. In this case, paging overheads can be reduced. However, if the terminal remains in NCM_CONNECTED all the time, when the terminal moves and is connected to a new RAN node, the terminal needs to update a location of the terminal to the core network. In this case, location update overheads are caused. Therefore, the paging overheads and the location update overheads need to be balanced, to make total overheads lowest.

In the prior art, a connection status and a state transition condition of the terminal are preconfigured on the terminal and a network side device. A signaling connection status and a state transition condition of the terminal that are preconfigured on the terminal and the core network are: Before sending or receiving data, the terminal first needs to establish a signaling connection to the core network, and in this case, the signaling connection status is NCM_CONNECTED. After data receiving or sending is terminated, the signaling connection is released, and the signaling connection status is switched to NCM_IDLE. Based on such a fixed configuration, it is very difficult to balance the paging overheads and the location update overheads.

The session connection status indicates an activation status of a session context of a service between the terminal and the network. In the prior art, the connection status and the state transition condition of the terminal are preconfigured on the terminal and a network side device. A session connection status and a state transition condition of the terminal that are preconfigured on the terminal and the RAN node are as follows: When the terminal is receiving or sending service data, a session connection status is SESSION CONTEXT ACTIVE; and when service data receiving or sending is terminated, the session connection status is switched to SESSION CONTEXT INACTIVE, and the RAN node deletes a session context. Based on such a fixed configuration, for a terminal that performs a data service frequently, for example, performs data receiving or sending at one-minute intervals, signaling overheads are relatively high because a session context needs to be re-established each time data receiving or sending is performed. For a terminal that performs a data service infrequently, for example, performs data receiving or sending at one-day intervals, additional storage and maintenance overheads are caused because a session context is stored all the time.

In conclusion, in the prior art, the connection status and the state transition condition of the terminal are preconfigured on the terminal and the network side device, and the fixed configuration usually cannot be flexibly changed based on an actual application scenario of a terminal. Consequently, network performance is reduced.

SUMMARY

This application provides a method and an apparatus for managing a mobility patter of a terminal. The mobility pattern includes mobility management configuration information, for example, configuration information such as a connection status, a location area list, a location update timer, and a paging area, to flexibly configure and manage mobility management configuration information of the terminal, so as to optimize network performance.

According to a first aspect, a method for managing a mobility pattern of a terminal is provided, where the method is implemented in the following manner: obtaining, by a control plane function CPF entity, mobility pattern related information of a terminal; determining a first mobility pattern of the terminal based on the mobility pattern related information of the terminal; and sending, by the CPF entity, the first mobility pattern to a radio access network RAN node, so that the RAN node determines a second mobility pattern of the terminal based on the first mobility pattern. In this way, the CPF entity can select a mobility pattern suitable for the terminal based on an actual application scenario of the terminal, and the RAN node determines the mobility pattern eventually configured for the terminal and notifies the terminal. This breaks through a fixed mobility pattern configuration of the terminal, implements flexible configuration and management of the mobility pattern of the terminal based on the actual application scenario of the terminal, and optimizes network performance.

In a possible design, the CPF entity directly sends the first mobility pattern of the terminal to the terminal.

In a possible design, the mobility pattern related information includes at least one of the following information: mobility pattern capability information, service feature information, and historical mobility event statistics information; or the mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location. In this way, historical data of the terminal can be fully used to obtain an actual application scenario of the terminal, so that the CPF entity and the RAN node can accurately determine the mobility pattern suitable for the actual application scenario of the terminal.

In a possible design, the determining, by the CPF entity, a first mobility pattern of the terminal based on the mobility pattern related information of the terminal is implemented in the following manner: determining, by the CPF entity based on the mobility pattern capability information of the terminal, the mobility pattern that can be supported by the terminal; and selecting by the CPF entity based on the historical mobility event statistics information of the terminal, a mobility pattern from the mobility pattern that can be supported by the terminal; or selecting, by the CPF entity based on the service feature information of the terminal, a mobility pattern from the mobility pattern that can be supported by the terminal; or selecting, by the CPF entity based on the service feature information and the historical mobility event statistics information of the terminal, a mobility pattern from the mobility pattern that can be supported by the terminal.

In a possible design, both the first mobility pattern and the second mobility pattern include at least one of the following mobility management configuration information: a connection status, a location area list, a location update timer, or a paging area.

In a possible design, the connection status includes at least one of a signaling connection status or a session connection status; and the signaling connection status includes a non-access stratum NAS signaling connection status or a radio resource control RRC signaling connection status.

In a possible design, the RAN node further sends the determined second mobility pattern to the CPF entity. In this way, the terminal, the RAN node, and the CPF entity can learn of the mobility pattern used by the terminal, so that network matching is consistent.

According to a second aspect, a method for managing a mobility pattern of a terminal is provided, including: receiving, by a radio access network RAN node, a first mobility pattern of a terminal sent by a control plane function CPF entity; determining, by the RAN node, a second mobility pattern of the terminal based on the first mobility pattern; and sending, by the RAN node, the determined second mobility pattern to the terminal. In this way, the RAN node can configure a mobility pattern for the terminal based on a mobility pattern that is sent by the CPF entity and that matches an actual application scenario of the terminal, and notify the terminal. This breaks through a fixed mobility pattern configuration of the terminal, implements flexible configuration and management of the mobility pattern of the terminal based on the actual application scenario of the terminal, and optimizes network performance.

In a possible design, the determining, by the RAN node, a second mobility pattern of the terminal based on the first mobility pattern may be implemented in the following manner: pre-obtaining, by the RAN node, a mobility pattern that can be supported by the RAN node; and determining, by the RAN node, the first mobility pattern as the second mobility pattern if the RAN node can support mobility management configuration information included in the first mobility pattern; or selecting, by the RAN node, a default mobility pattern as the second mobility pattern if the RAN node does not support mobility management configuration information included in the first mobility pattern. Based on the flexible configuration of the mobility pattern of the terminal, a configuration of the RAN node is considered, to ensure a normal operation between the RAN node and the terminal.

In a possible design, both the first mobility pattern and the second mobility pattern include at least one of the following mobility management configuration information: a connection status, a location area list, a location update timer, or a paging area.

In a possible design, the connection status includes at least one of a signaling connection status or a session connection status; and the signaling connection status includes a non-access stratum NAS signaling connection status or a radio resource control RRC signaling connection status.

In a possible design, the RAN node further sends the determined second mobility pattern to the CPF entity. In this way, the terminal, the RAN node, and the CPF entity can learn of the mobility pattern used by the terminal, so that network matching is consistent.

According to a third aspect, a method for managing a mobility pattern of a terminal is provided, including: receiving, by a radio access network RAN node, mobility pattern related information of a terminal sent by a control plane function CPF entity; determining, by the RAN node, a mobility pattern of the terminal based on the mobility pattern related information; and sending, by the RAN node, the mobility pattern to the terminal. In this way, the RAN node can select the mobility pattern suitable for the terminal based on an actual application scenario of the terminal, and notify the terminal. This breaks through a fixed mobility pattern configuration of the terminal, implements flexible configuration and management of the mobility pattern of the terminal based on the actual application scenario of the terminal, and optimizes network performance.

In a possible design, the mobility pattern related information includes at least one of the following information: mobility pattern capability information, service feature information, or historical mobility event statistics information; and the mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location. In this way, historical data of the terminal can be fully used to obtain an actual application scenario of the terminal, so that the CPF entity and the RAN node can accurately determine the mobility pattern suitable for the actual application scenario of the terminal.

In a possible design, the determining, by the RAN node, a mobility pattern of the terminal based on the mobility pattern related information of the terminal may be implemented in the following manner: determining, by the RAN node based on the mobility pattern capability information of the terminal, the mobility pattern supported by the terminal; and selecting, by the RAN node based on the historical mobility event statistics information of the terminal, a mobility pattern from the mobility pattern that can be supported by the terminal; or selecting, by the RAN node based on the service feature information of the terminal, a mobility pattern from the mobility pattern that can be supported by the terminal; or selecting, by the RAN node based on the service feature information and the historical mobility event statistics information of the terminal, a mobility pattern from the mobility pattern that can be supported by the terminal.

In a possible design, the mobility pattern includes at least one of the following mobility management configuration information: a connection status, a location area list, a location update timer, or a paging area.

In a possible design, the connection status includes at least one of a signaling connection status or a session connection status; and the signaling connection status includes a non-access stratum NAS signaling connection status or a radio resource control RRC signaling connection status.

In a possible design, the RAN node further sends the determined mobility pattern to the CPF entity. In this way, the terminal, the RAN node, and the CPF entity can learn of the mobility pattern used by the terminal, so that network matching is consistent.

According to a fourth aspect, a method for managing a mobility pattern of a terminal is provided, including: sending, by a terminal, mobility pattern related information of the terminal to a control plane function CPF entity, where the mobility pattern related information is used to determine a first mobility pattern of the terminal; receiving, by the terminal, a second mobility pattern sent by a RAN node; and determining, by the terminal based on the second mobility pattern, a mobility management configuration information used by the terminal. In this way, the terminal does not use the mobility pattern based on a fixed configuration of the mobility pattern that can be supported by the terminal, but flexibly uses the mobility pattern based on a configuration of a network side device, to achieve an objective of matching the mobility pattern of the terminal with an actual application scenario of the terminal.

In a possible design, the mobility pattern related information includes at least one of the following information: mobility pattern capability information, service feature information, or historical mobility event statistics information; and the mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location.

According to a fifth aspect, an apparatus for managing a mobility pattern of a terminal is provided. The apparatus has a function of implementing a behavior of the CPF entity in any one of the first aspect or the possible designs of the first aspect. The function may be implemented by using hardware, or may be implemented by hardware by executing corresponding software. The hardware or the software includes one or more modules corresponding to the foregoing function.

According to a sixth aspect, an apparatus for managing a mobility pattern of a terminal is provided. The apparatus has a function of implementing a behavior of the RAN node in any one of the second aspect or the possible designs of the second aspect. The function may be implemented by using hardware, or may be implemented by hardware by executing corresponding software. The hardware or the software includes one or more modules corresponding to the foregoing function.

According to a seventh aspect, an apparatus for managing a mobility pattern of a terminal is provided. The apparatus has a function of implementing a behavior of the RAN node in any one of the third aspect or the possible designs of the third aspect. The function may be implemented by using hardware, or may be implemented by hardware by executing corresponding software. The hardware or the software includes one or more modules corresponding to the foregoing function.

According to an eighth aspect, a terminal is provided. The terminal has a function of implementing a behavior of the terminal in any one of the fourth aspect or the possible designs of the fourth aspect. The function may be implemented by using hardware, or may be implemented by hardware by executing corresponding software. The hardware or the software includes one or more modules corresponding to the foregoing function.

According to a ninth aspect, a CPF entity is provided, including a transceiver, a memory, and a processor. The memory is configured to store a set of programs. The processor is configured to invoke the programs stored in the memory, to perform the following operations: obtaining mobility pattern related information of a terminal; determining a first mobility pattern of the terminal based on the obtained mobility pattern related information of the terminal; and sending the first mobility pattern to a radio access network RAN node by using the transceiver, where the first mobility pattern is used by the RAN node to determine a second mobility pattern of the terminal. In this way, the CPF entity can select a mobility pattern suitable for the terminal based on an actual application scenario of the terminal, and the RAN node determines the mobility pattern eventually configured for the terminal and notifies the terminal. This breaks through a fixed mobility pattern configuration of the terminal, implements flexible configuration and management of the mobility pattern of the terminal based on the actual application scenario of the terminal, and optimizes network performance.

In a possible design, the mobility pattern related information includes at least one of the following information: mobility pattern capability information, service feature information, or historical mobility event statistics information; and the mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location. In this way, historical data of the terminal can be fully used to obtain an actual application scenario of the terminal, so that the CPF entity and the RAN node can accurately determine the mobility pattern suitable for the actual application scenario of the terminal.

In a possible design, the processor is configured to: determine, based on the mobility pattern capability information of the terminal, the mobility pattern that can be supported by the terminal; and select, based on the historical mobility event statistics information of the terminal, a mobility pattern from the mobility pattern that can be supported by the terminal; or select, based on the service feature information of the terminal, a mobility pattern from the mobility pattern that can be supported by the terminal; or select, based on the service feature information and the historical mobility event statistics information of the terminal, a mobility pattern from the mobility pattern that can be supported by the terminal.

In a possible design, both the first mobility pattern and the second mobility pattern include at least one of the following mobility management configuration information: a connection status, a location area list, a location update timer, or a paging area.

In a possible design, the connection status includes at least one of a signaling connection status or a session connection status; and the signaling connection status includes a non-access stratum NAS signaling connection status or radio resource control RRC signaling connection status.

According to a tenth aspect, a radio access network RAN node is provided, including a transceiver, a memory, and a processor. The memory is configured to store a set of programs. The processor is configured to invoke the programs stored in the memory, to perform the following operations: receiving, by using the transceiver, a first mobility pattern of a terminal sent by a control plane function CPF entity; determining a second mobility pattern of the terminal based on the first mobility pattern; and sending the determined second mobility pattern to the terminal. In this way, the RAN node can configure a mobility pattern for the terminal based on a mobility pattern that is sent by the CPF entity and that matches an actual application scenario of the terminal, and notify the terminal. This breaks through a fixed mobility pattern configuration of the terminal, implements flexible configuration and management of the mobility pattern of the terminal based on the actual application scenario of the terminal, and optimizes network performance.

In a possible design, the processor is configured to: pre-obtain a mobility pattern that can be supported by the CPF entity; and determine the first mobility pattern as the second mobility pattern if the CPF entity can support mobility management configuration information included in the first mobility pattern; or select a default mobility pattern as the second mobility pattern if the CPF entity does not support mobility management configuration information included in the first mobility pattern. Based on the flexible configuration of the mobility pattern of the terminal, a configuration of the RAN node is fully considered, to ensure a normal operation between the RAN node and the terminal.

In a possible design, both the first mobility pattern and the second mobility pattern include at least one of the following mobility management configuration information: a connection status, a location area list, a location update timer, or a paging area.

In a possible design, the connection status includes at least one of a signaling connection status or a session connection status; and the signaling connection status includes a non-access stratum NAS signaling connection status or a radio resource control RRC signaling connection status.

According to an eleventh aspect, a radio access network RAN node is provided, including a transceiver, a memory, and a processor. The memory is configured to store a set of programs. The processor is configured to invoke the programs stored in the memory, to perform the following operations: receiving, by using the transceiver, mobility pattern related information of a terminal sent by a control plane function CPF entity; determining a mobility pattern of the terminal based on the mobility pattern related information; and sending the mobility pattern to the terminal. In this way, the RAN node can select the mobility pattern suitable for the terminal based on an actual application scenario of the terminal, and notify the terminal. This breaks through a fixed mobility pattern configuration of the terminal, implements flexible configuration and management of the mobility pattern of the terminal based on the actual application scenario of the terminal, and optimizes network performance.

In a possible design, the mobility pattern related information includes at least one of the following information: mobility pattern capability information, service feature information, or historical mobility event statistics information; and the mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location. In this way, historical data of the terminal can be fully used to obtain an actual application scenario of the terminal, so that the CPF entity and the RAN node can accurately determine the mobility pattern suitable for the actual application scenario of the terminal.

In a possible design, the processor is configured to: determine, based on the mobility pattern capability information of the terminal, the mobility pattern supported by the terminal; and select, based on the historical mobility event statistics information of the terminal, a mobility pattern from the mobility pattern that can be supported by the terminal; or select, based on the service feature information of the terminal, a mobility pattern from the mobility pattern that can be supported by the terminal; or select, based on the service feature information and the historical mobility event statistics information of the terminal, a mobility pattern from the mobility pattern that can be supported by the terminal.

In a possible design, the mobility pattern includes at least one of the following mobility management configuration information: a connection status, a location area list, a location update timer, or a paging area.

In a possible design, the connection status includes at least one of a signaling connection status or a session connection status; and the signaling connection status includes a non-access stratum NAS signaling connection status or a radio resource control RRC signaling connection status.

According to a twelfth aspect, a terminal is provided, including a transceiver, a memory, and a processor. The memory is configured to store a set of programs. The processor is configured to invoke the programs stored in the memory, to perform the following operations: sending mobility pattern related information of the terminal to a control plane function CPF entity, where the mobility pattern related information is used to determine a first mobility pattern of the terminal; receiving a second mobility pattern sent by a RAN node; and determining, based on the second mobility pattern, mobility management configuration information used by the terminal. In this way, the terminal does not use the mobility pattern based on a fixed configuration of the mobility pattern that can be supported by the terminal, but flexibly uses the mobility pattern based on a configuration of a network side device, to achieve an objective of matching the mobility pattern of the terminal with an actual application scenario of the terminal.

In a possible design, the mobility pattern related information includes at least one of the following information: mobility pattern capability information, service feature information, or historical mobility event statistics information; and the mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location.

DESCRIPTION OF EMBODIMENTS

To make the objectives, technical solutions, and advantages of this application clearer, the following further describes this application in detail with reference to the accompanying drawings. Apparently, the described embodiments are merely some rather than all of the embodiments of this application. All other embodiments obtained by a person of ordinary skill in the art based on the embodiments of this application without creative efforts shall fall within the protection scope of this application.

For a problem in the prior art that network performance is reduced because fixed mobility management configuration information of a terminal cannot be flexibly changed based on an actual application scenario of the terminal, the embodiments of this application provide a method and an apparatus for managing a mobility pattern of a terminal. A control plane function (CPF) entity selects a mobility pattern suitable for the terminal based on an actual application scenario of the terminal, and a RAN node determines a mobility pattern eventually configured for the terminal and notifies the terminal. This breaks through a fixed mobility pattern configuration of the terminal, implements flexible configuration and management of the mobility pattern of the terminal based on the actual application scenario of the terminal, and optimizes network performance.

The method provided in the embodiments of this application may be applicable to network systems using various radio access technologies, such as a Long Term Evolution (LTE) system, a 5G communications system, or more future communications systems. This application describes the solutions in detail by using the 5G communications system as an example.

The 5G communications system constructs a network in a flexible manner, and the network is further abstracted as a network slice. A network slice technology is to slice a physical network in a plurality of virtual end-to-end networks. Each virtual network, including a device, access, transmission, and a core network that are inside the network, is logically independent. Each network slice is formed by instantiating a separate network function or a combination of functions, has a different function and feature, and is oriented towards a different requirement and service.

Figure 1:
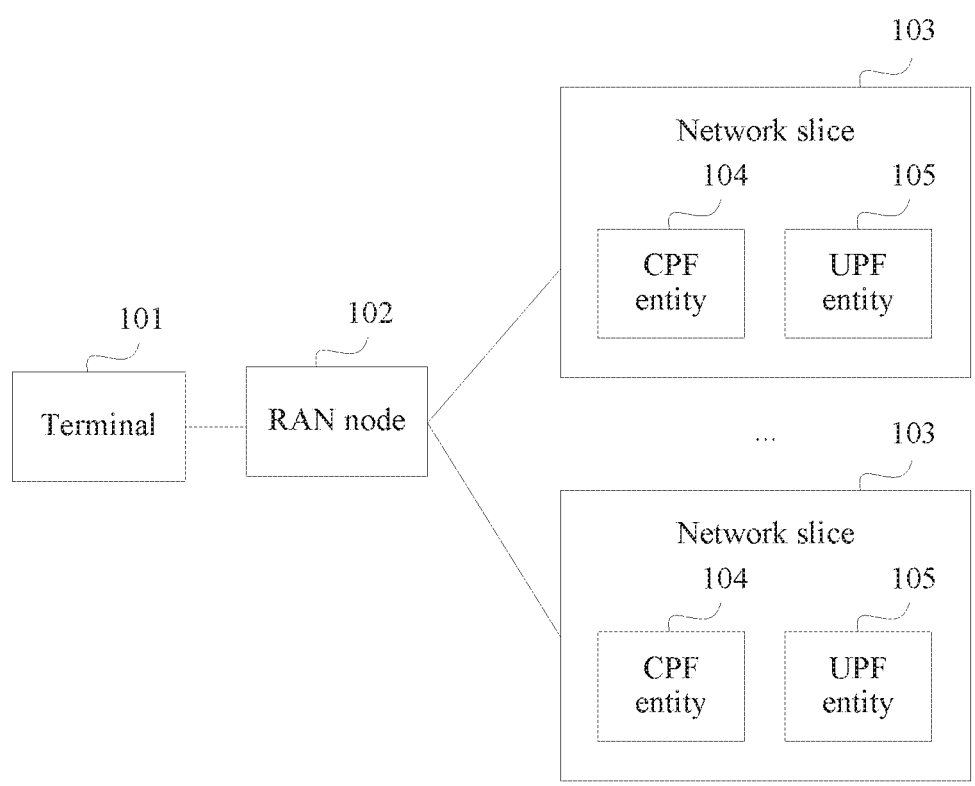
FIG. 1 is an architectural diagram of a communications system according to an embodiment of this application.

As shown in FIG. 1, a communications system architecture 100 in an embodiment of this application includes a terminal 101, a RAN node 102, and several network slices 103. A network slice 103 includes a CPF entity 104 and a user plane function (UPF) entity 105. The CPF entity 104 mainly implements control plane related signaling message processing, including mobility management (MM) functions such as device access authentication, secure encryption, and location registration, session management (SM for short) functions such as establishment, releasing, and changing of a user plane transmission path, and related Policy and Charging (PC) control functions such as quality of service (QoS) and charging. In this embodiment of this application, the CPF entity is one entity having both an MM function and an SM function, or the CPF entity includes an entity having an MM function or an entity having an SM function. The UPF entity 105 mainly implements functions such as routing and forwarding of user plane data. The terminal 101 may access one or more network slices 103 by using the RAN node 102.

Based on the communications system architecture shown in FIG. 1, the following describes in detail the solutions provided in this application with reference to the accompanying drawings and example embodiments.

Figure 2:
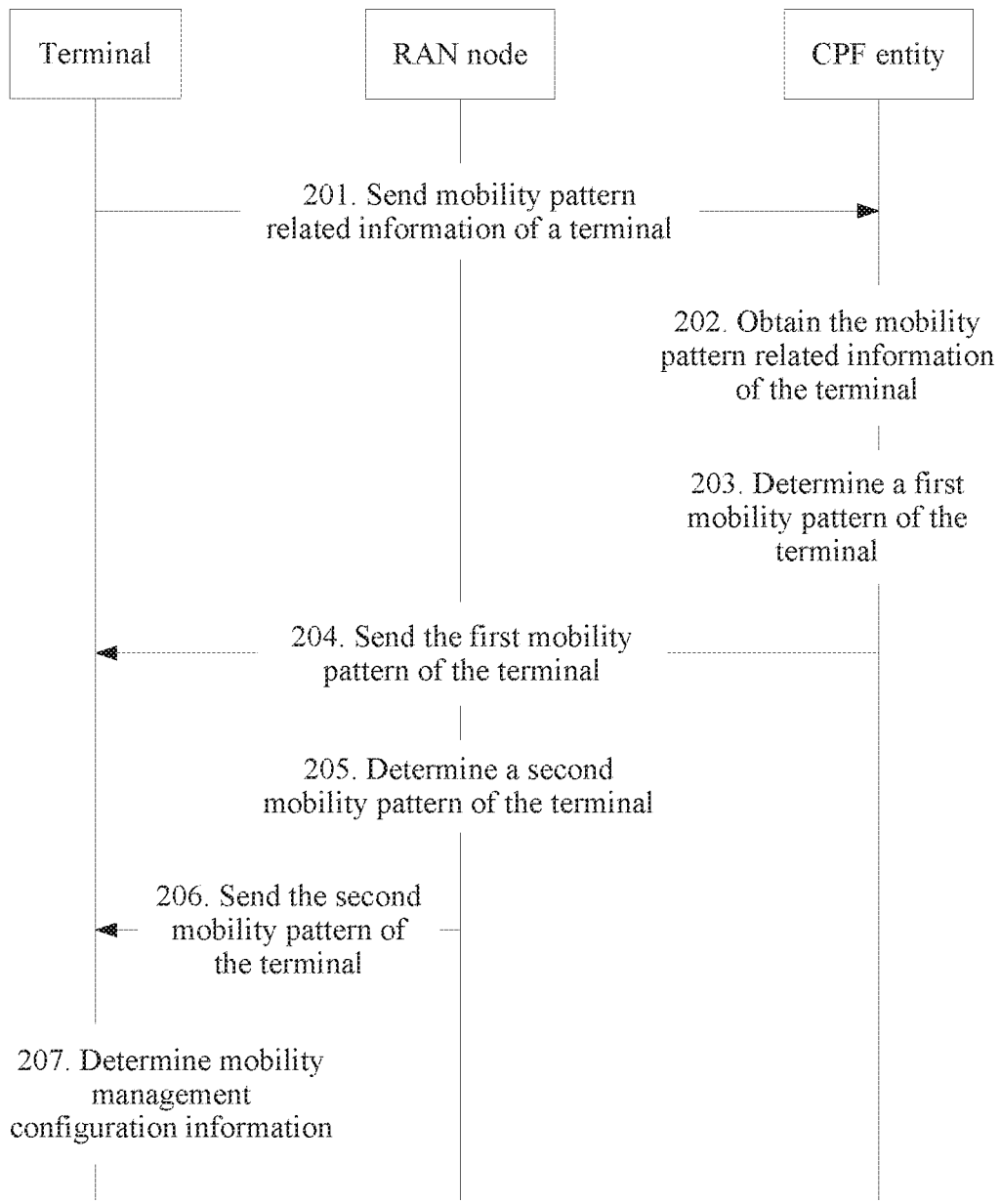
FIG. 2 is a first flowchart of a method for managing a mobility pattern of a terminal according to an embodiment of this application.

Referring to FIG. 2, a procedure of a method for managing a mobility pattern of a terminal in an embodiment of this application is as follows.

Step 201: A terminal sends mobility pattern related information of the terminal to a CPF entity.

The mobility pattern related information is used by the CPF entity to determine a first mobility pattern of the terminal. The first mobility pattern is used by a RAN node to determine a second mobility pattern of the terminal.

Optionally, the mobility pattern related information includes at least one of the following information: mobility pattern capability information, service feature information, or historical mobility event statistics information. The mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location.

Optionally, both the first mobility pattern and the second mobility pattern include at least one of the following mobility management configuration information: a mobility pattern, a location area list, a location update timer, or a paging area.

Step 202: The CPF entity obtains the mobility pattern related information of the terminal.

The CPF entity may obtain the mobility pattern related information by receiving the mobility pattern related information sent by the terminal, or obtain the mobility pattern related information by using subscription information of the terminal.

The mobility pattern related information is determined based on an application scenario of the terminal, mainly includes information such as a capability of the terminal, a mobility feature, and a service feature, and may specifically include one or any combination of the following information:

the mobility pattern capability information, the service feature information, and the historical mobility event statistics information.

The mobility pattern capability information includes the mobility pattern that can be supported by the terminal, the service feature information includes at least one of the periodic service indication of the terminal, the duration of single service communication of the terminal, or the service period of the terminal, and the historical mobility event statistics information includes historical statistics information of mobility events such as handover and location update that occur on the terminal in a particular time segment and/or at a particular location.

Step 203: The CPF entity determines a first mobility pattern of the terminal based on the mobility pattern related information of the terminal.

Optionally, the CPF entity determines the first mobility pattern of the terminal in the following manner:

First, the CPF entity determines, based on the mobility pattern capability information of the terminal, the mobility pattern that can be supported by the terminal; and then, the CPF entity selects, based on the historical mobility event statistics information of the terminal, at least one mobility pattern from the mobility pattern that can be supported by the terminal; or the CPF entity selects, based on the service feature information of the terminal, at least one mobility pattern from the mobility pattern that can be supported by the terminal; or the CPF entity selects, based on the service feature information and the historical mobility event statistics information of the terminal, at least one mobility pattern from the mobility pattern that can be supported by the terminal.

The CPF entity determines first mobility management configuration information of the terminal based on the selected at least one mobility pattern.

Optionally, after selecting the at least one mobility pattern from the mobility pattern that can be supported by the terminal, the CPF entity determines a state parameter corresponding to the selected at least one mobility pattern.

Step 204: The CPF entity sends the first mobility pattern to a RAN node.

The first mobility pattern is used by the RAN node to determine the second mobility pattern of the terminal. The RAN node receives the first mobility pattern of the terminal sent by the CPF entity.

Both the first mobility pattern and the second mobility pattern include at least one of the following mobility management configuration information: a connection status, the location area list, the location update timer, or the paging area.

Step 205: After receiving the first mobility pattern of the terminal sent by the CPF entity, the RAN node determines a second mobility pattern of the terminal based on the first mobility pattern.

Step 206: The RAN node sends the determined second mobility pattern to the terminal, and the terminal receives the second mobility pattern sent by the RAN node.

Optionally, the RAN node further sends the second mobility pattern to the CPF entity, so that the CPF entity learns of the mobility pattern eventually used by the terminal.

Step 207: The terminal determines mobility management configuration information of the terminal based on at least one mobility pattern included in the second mobility pattern.

The connection status in this embodiment of this application includes at least one of a signaling connection status or a session connection status.

Specifically, in step 203, before the CPF entity determines the first mobility pattern of the terminal, the CPF entity may preconfigure a mobility pattern set that can be supported by the CPF entity. The mobility pattern set includes at least one mobility pattern and a pattern index value corresponding to each mobility pattern. Optionally, the mobility pattern set further includes a transition condition of each mobility pattern. For ease of description, the mobility pattern set herein configured by the CPF entity may be referred to as a first mobility pattern set.

A possible implementation of the mobility pattern set in this embodiment of this application is a form of one or more mobility pattern lists shown in Table 1 to Table 3. Pattern index values in each mobility pattern list include a pattern 1, a pattern 2, a pattern 3, and the like.

Mobility patterns such as the first mobility pattern and the second mobility pattern in this embodiment of this application include at least one pattern shown in Table 1, Table 2, and Table 3.

It should be noted that if a state pattern list does not include a state parameter, the CPF entity needs to further determine a state parameter corresponding to the first mobility pattern, and notify the RAN node.

TABLE 1

| Pattern index value | Mobility pattern configuration information | | |
|---|---|---|---|
| | State name | Location area list | Location update timer |
| Pattern 1 | NCM_IDLE; NCM_CONNECTED | Location area 1; Location area 2; Location area 3 | 2 minutes |
| Pattern 2 | NCM_CONNECTED | Location area 1 | 2 hours |
| ... | ... | ... | ... |

TABLE 2

| Pattern index value | Mobility pattern configuration information | | |
|---|---|---|---|
| | State name | Location area list | Location update timer |
| Pattern 1 | RRC_IDLE; RRC_CONNECTED | Location area 1; Location area 2; Location area 3 | 2 minutes |
| Pattern 2 | RRC_CONNECTED; RRC_INACTIVE | Location area 1 | 2 hours |
| ... | ... | ... | ... |

TABLE 3

| Pattern index value | Mobility pattern configuration information | | |
|---|---|---|---|
| | State name | Location area list | Location update timer |
| Pattern 1 | SESSION CONTEXT ACTIVE; SESSION CONTEXT INACTIVE | Location area 1; Location area 2; Location area 3 | 2 minutes |
| Pattern 2 | SESSION CONTEXT ACTIVE; SESSION CONTEXT INACTIVE | Location area 1 | 2 hours |
| ... | ... | ... | ... |

Optionally, the CPF entity determines the first mobility pattern of the terminal in the following manner:

First, the CPF entity determines, based on the mobility pattern capability information of the terminal, at least one mobility pattern that is in the first mobility pattern set and that can be supported by the terminal; and then, the CPF entity selects, based on the historical mobility event statistics information of the terminal, the first mobility pattern that corresponds to the historical mobility event statistics information of the terminal from the at least one mobility pattern that can be supported by the terminal; or the CPF entity selects, based on the service feature information of the terminal, the first mobility pattern that corresponds to the service feature information of the terminal from the at least one mobility pattern that can be supported by the terminal; or the CPF entity selects, based on the service feature information and the historical mobility event statistics information of the terminal, the first mobility pattern that corresponds to the service feature information and the historical mobility event statistics information of the terminal from the at least one mobility pattern that can be supported by the terminal.

The CPF entity may send the determined first mobility pattern to the RAN node by using, but not limited to, the following manner:

The CPF entity sends a pattern index value corresponding to the first mobility pattern to the RAN node; or the CPF entity sends connection status configuration information of the terminal included in the first mobility pattern to the RAN node.

Before the RAN node determines the second mobility pattern of the terminal based on the first mobility pattern, the RAN node pre-obtains a mobility pattern set that can be supported by the RAN node. For ease of description, the mobility pattern set herein that is obtained by the RAN node and that can be supported by the RAN node may be referred to as a second mobility pattern set.

The RAN node determines whether the first mobility pattern is included in the second mobility pattern set. If the first mobility pattern is included in the second mobility pattern set, the RAN node determines the first mobility pattern as the second mobility pattern. If the first mobility pattern is not included in the second mobility pattern set, the RAN node selects a default mobility pattern from the second mobility pattern set as the second mobility pattern according to a default configuration.

In other words, the RAN node determines the second mobility pattern of the terminal based on the first mobility pattern and according to a local configuration policy. For example, the first mobility pattern includes states such as RRC_IDLE and RRC_INACTIVE. However, the RAN node does not support the connection state RRC_INACTIVE. In this case, the RAN node selects default states: RRC_IDLE and RRC_CONNECTED.

The following further describes in detail the foregoing solutions provided in the embodiments of this application with reference to two application scenarios in which a CPF entity is one entity having an MM function and an SM function and in which a CPF entity includes an entity having an MM function and an entity having an SM function.

In a first application scenario, a CPF entity is one function entity having both an MM function and an SM function.

Figure 3:
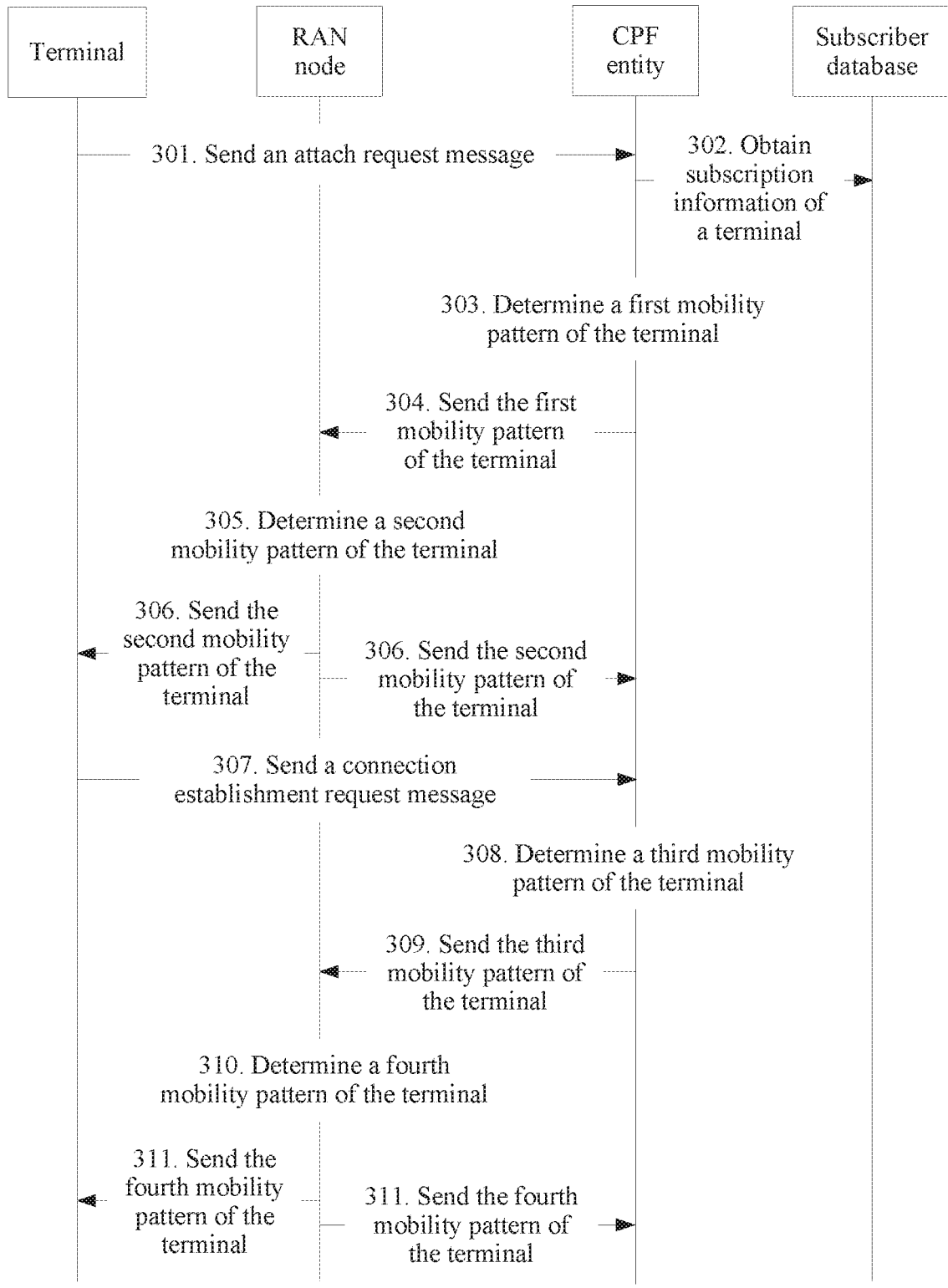
FIG. 3 is a second flowchart of a method for managing a mobility pattern of a terminal according to an embodiment of this application.

In this scenario, one CPF entity has both the MM function and the SM function. Method steps are shown in FIG. 3.

Step 301: A terminal sends an attach request message to the CPF entity.

The attach request message carries mobility pattern capability information of the terminal, to indicate a mobility pattern that can be supported by the terminal.

Step 302: The CPF entity obtains subscription information of the terminal from a subscriber database.

Alternatively, the CPF entity may obtain the subscription information of the terminal from another CPF entity to which the terminal is previously attached. This step is performed when the CPF entity does not know the subscription information of the terminal. Certainly, if the CPF entity already knows the subscription information of the terminal, step 302 is not performed.

The subscription information of the terminal includes some mobility pattern related information of the terminal, namely, selective assistance information related to a mobility pattern of the terminal, including some service feature information of the terminal, for example, service parameters such as a periodic service indication, communication duration, a communication period, and a fixed terminal indication, and a connection status parameter such as a periodic location update timer.

Step 303: The CPF entity obtains historical mobility event statistics information of the terminal, and determines a first mobility pattern of the terminal based on the historical mobility event statistics information of the terminal and a mobility pattern capability of the terminal.

The historical mobility event statistics information of the terminal includes historical statistics information of mobility events such as handover and location update that occur on the terminal in a particular time segment and/or at a particular location, for example, a quantity of times of events such as handover and location update that occur on the terminal in a particular time segment. A mobility feature of the terminal, for example, whether the terminal is a fixed terminal, a low-mobility terminal, or a high-mobility terminal, can be determined by collecting statistics on these mobility events. The CPF entity may set a classification rule for the mobility feature of the terminal. This is not limited in this application.

The CPF entity prestores a mobility pattern set. A possible implementation of the mobility pattern set is a form of one or more mobility pattern lists shown in Table 1 to Table 3. Pattern index values in each mobility pattern list include a subpattern 1, a subpattern 2, a subpattern 3, and the like.

The CPF entity selects, based on the mobility pattern capability of the terminal and from the mobility pattern set prestored by the CPF entity, a subset of mobility patterns that can be supported by the terminal, and selects the first mobility pattern suitable for the terminal from the subset based on the historical mobility event statistics information of the terminal.

For example, statistics on a quantity of mobility events such as location update and handover that occur on the terminal in each time segment in each day of one month are collected. It can be learned that location update and handover occur on the terminal very frequently in a time segment from 7:00 to 9:00 in each day. In other words, a location of the terminal changes relatively frequently, and a user may be on a way to work in the time segment. Location update and handover occur fewer times in a time segment from 9:00 to 21:00. The user may be in an office area and a surrounding area in the time segment. Location update and handover scarcely occur in a time segment from 21:00 to 7:00. In other words, the location of the terminal almost has no change, and the user may be at home in the time segment. Therefore, the CPF entity may determine that the first mobility pattern of the terminal in the time segment from 7:00 to 9:00 is the subpattern 1 in Table 1 and the subpattern 1 in Table 2. To be specific, the terminal is in NCM_CONNECTED/RRC_CONNECTED when data receiving or sending is performed, and switched to NCM_IDLE/RRC_IDLE when the data receiving or sending is completed. In addition, the CPF entity may allocate a location area with a relatively large range to the terminal, to avoid signaling overheads caused by location update initiated because the terminal frequently moves outside the location area. The CPF entity may determine that the first mobility pattern of the terminal in the time segment from 9:00 to 21:00 is the pattern 3 in Table 1 and the pattern 3 in Table 2. To be specific, a NAS signaling connection of the terminal remains in an NCM_CONNECTED state all the time. The RRC signaling connection is RRC_CONNECTED when data sending is performed, and is RRA_PCH when no data sending is performed. In addition, a RAN routing area (RRA) parameter may be set to a plurality of cells corresponding to the office area and the surrounding area in which the terminal is located. In other words, paging is performed in only an RRA range, to avoid paging signaling overheads caused because a paging range is excessively large.

The CPF entity may determine that the first mobility pattern of the terminal in the time segment from 21:00 to 7:00 is still the pattern 3 in Table 1 and the pattern 3 in Table 2, but the RRA parameter is set to a cell in which the terminal is currently located, so that the paging range is further decreased to a particular cell. In addition, a relatively long periodic location update timer may be further set.

Alternatively, the particular time segment in the foregoing example may be replaced with a particular location. To be specific, the mobility pattern is determined based on historical statistics information of mobility events that occur on the terminal at the particular location (such as home or the office area).

The connection status includes at least one of a signaling connection status or a service connection status. When the first mobility pattern is selected for the terminal herein, only the signaling connection status suitable for the terminal may be considered. Subsequently, when the terminal requires a service connection, a service feature parameter of the terminal is then considered, to determine a session connection status.

Step 304: The CPF entity sends the selected first mobility pattern suitable for the terminal to a RAN node.

Specifically, a pattern index value corresponding to the first mobility pattern of the terminal is sent to the RAN node, or a parameter included in the first mobility pattern of the terminal is directly sent. In addition, some parameter configurations such as the periodic location update timer of the terminal that are related to the mobility pattern and obtained from the subscription information of the terminal are sent to the RAN node.

Step 305: The RAN node determines an eventually used second mobility pattern for the terminal based on the first mobility pattern of the terminal and according to a local configuration policy.

If the RAN node cannot support the first mobility pattern, the RAN node selects a default mobility pattern and determines the default mobility pattern as the second mobility pattern eventually used by the terminal.

If the RAN node can support the first mobility pattern, the RAN node determines the first mobility pattern as the second mobility pattern eventually used by the terminal.

Step 306: The RAN node separately sends, to the terminal and the CPF entity, the eventually used second mobility pattern determined for the terminal.

Step 307: The terminal sends a connection establishment request message to the CPF entity.

Step 308: The CPF entity determines a third mobility pattern of the terminal based on service feature information of the terminal and mobility pattern capability information of the terminal that are obtained in step 302.

Specifically, similar to step 303, the CPF entity selects, based on the mobility pattern capability of the terminal and from the mobility pattern set prestored by the CPF entity, a subset of mobility patterns that can be supported by the terminal, and selects the third mobility pattern suitable for the terminal from the subset based on the service feature information of the terminal.

For example, the service feature information of the terminal is a periodic service, where data receiving or sending is performed once in each communication period of 30 minutes. In this case, the CPF entity may determine that the third mobility pattern of the terminal is the pattern 3 in Table 3. A transition condition is: A state is SESSION CONTEXT ACTIVE after a session is established, switched to SESSION CONTEXT SUSPEND after data receiving or sending is completed, switched to SESSION CONTEXT ACTIVE when data sending is performed, and switched to SESSION CONTEXT INACTIVE after the session is released. When the service feature information of the terminal is changed, for example, changed to a periodic service, where data receiving or sending is performed once in each communication period of 1 day, the CPF entity may determine that the third mobility pattern of the terminal is the pattern 1 in Table 3, and a transition condition is: A state is SESSION CONTEXT ACTIVE after a session is established, switched to SESSION CONTEXT INACTIVE after data receiving or sending is completed, and switched to SESSION CONTEXT ACTIVE when data sending is performed and a session connection is re-established.

When the third mobility pattern is selected for the terminal herein, only a service mobility pattern suitable for the terminal may be considered.

Step 309: The CPF entity sends the selected third mobility pattern suitable for the terminal to the RAN node.

Specifically, a pattern index value corresponding to the third mobility pattern of the terminal is sent to the RAN node, or a parameter included in the third mobility pattern of the terminal is directly sent. In addition, some parameter configurations such as the periodic location update timer of the terminal that are related to the mobility pattern and obtained from the subscription information of the terminal are sent to the RAN node.

Step 310: The RAN node determines an eventually used fourth mobility pattern for the terminal based on the third mobility pattern of the terminal and according to a local configuration policy.

Step 311: The RAN node separately sends, to the terminal and the CPF entity, the eventually used fourth mobility pattern determined for the terminal.

It should be noted that if the terminal requires only an attachment process, and does not require a connection establishment process, only step 301 to step 306 need to be performed in this solution. Subsequently, when the terminal needs to perform a service, step 307 to step 311 are performed.

In a second application scenario, a CPF entity includes an entity having an MM function or an entity having an SM function.

Figure 4:
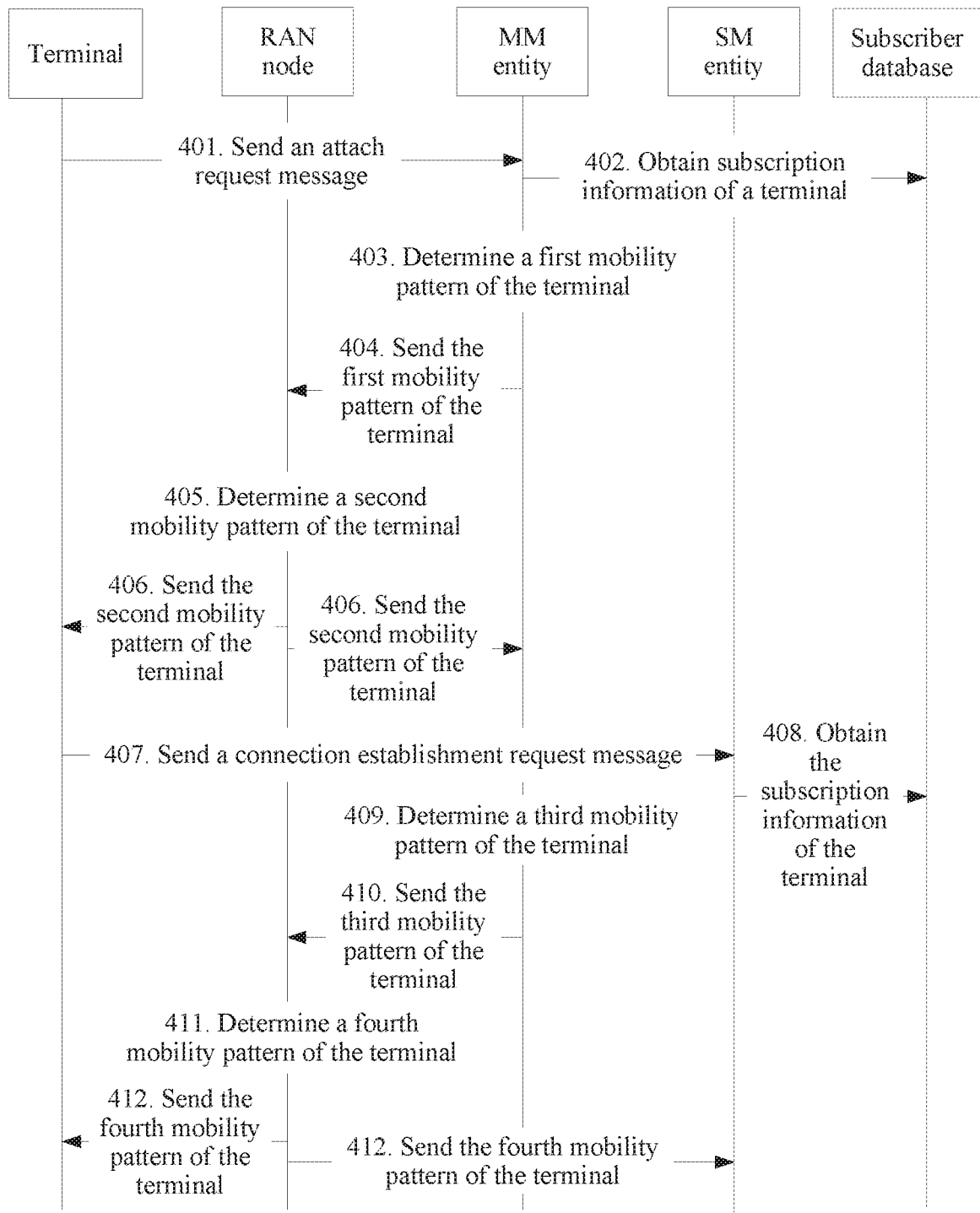
FIG. 4 is a third flowchart of a method for managing a mobility pattern of a terminal according to an embodiment of this application.

In this scenario, functions of the CPF entity are respectively implemented by using two function entities. The entity having the MM function may be referred to as an MM entity, and the entity having the SM function may be referred to as an SM entity. Method steps are shown in FIG. 4.

Step 401: A terminal sends an attach request message to the MM entity.

The attach request message carries mobility pattern capability information of the, to indicate a mobility pattern that can be supported by the terminal.

Step 402: The MM entity obtains subscription information of the terminal from a subscriber database.

Alternatively, the MM entity may obtain the subscription information of the terminal from another MM entity to which the terminal is previously attached. This step is performed when the MM entity does not know the subscription information of the terminal. Certainly, if the MM entity already knows the subscription information of the terminal, step 402 is not performed.

Step 403: The MM entity obtains historical mobility event statistics information of the terminal, and determines a first mobility pattern of the terminal based on the historical mobility event statistics information of the terminal and a mobility pattern capability of the terminal.

Step 404: The MM entity sends the selected first mobility pattern suitable for the terminal to a RAN node.

Compared with step 301 to step 304, in step 401 to step 404, other content is the same than an execution body that is changed from the CPF entity to the MM entity. Details are not described herein again.

Step 405: The RAN node determines an eventually used second mobility pattern for the terminal based on the first mobility pattern of the terminal and according to a local configuration policy.

Step 406: The RAN node separately sends, to the terminal and the MM entity, the eventually used second mobility pattern determined for the terminal.

Step 407: The terminal sends a connection establishment request message to the SM entity.

The connection establishment request message carries the mobility pattern capability information of the terminal, to indicate the mobility pattern that can be supported by the terminal.

Step 408: The SM entity obtains the subscription information of the terminal from the subscriber database.

Alternatively, the SM entity may obtain the subscription information of the terminal from another SM entity to which the terminal is previously attached. This step is performed when the SM entity does not know the subscription information of the terminal. Certainly, if the SM entity already knows the subscription information of the terminal, step 408 is not performed. The subscription information of the terminal includes some parameters related to the mobility pattern of the terminal, includes some service feature information of the terminal, for example, service parameters such as a periodic service indication, communication duration, a communication period, and a fixed terminal indication, and further includes a mobility pattern parameter such as a periodic location update timer.

Step 409: The SM entity determines a third mobility pattern of the terminal based on obtained service feature information of the terminal and obtained mobility pattern capability information of the terminal.

Step 410: The SM entity sends the selected third mobility pattern suitable for the terminal to the RAN node.

Step 411: The RAN node determines an eventually used fourth mobility pattern for the terminal based on the third mobility pattern of the terminal and according to a local configuration policy.

Step 412: The RAN node separately sends, to the terminal and the SM entity, the eventually used fourth mobility pattern determined for the terminal.

It should be noted that if the terminal requires only an attachment process, and does not require a connection establishment process, only step 401 to step 406 need to be performed in this solution. Subsequently, when the terminal needs to perform a service, step 407 to step 412 are performed.

Figure 5:
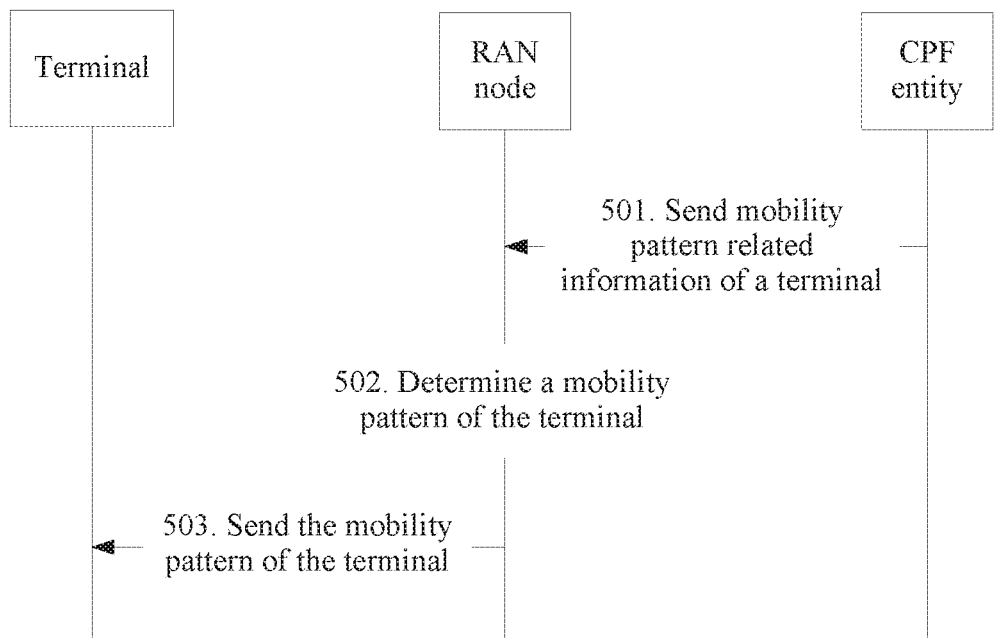
FIG. 5 is a fourth flowchart of a method for managing a mobility pattern of a terminal according to an embodiment of this application.

An embodiment of this application further provides another implementation of the method for managing a mobility pattern of a terminal. A RAN node determines a mobility pattern of a terminal based on an application scenario of the terminal. A specific procedure is shown in FIG. 5.

Step 501: A CPF entity sends mobility pattern related information of the terminal to the RAN node, and the RAN node receives the mobility pattern related information of the terminal sent by the CPF entity.

The mobility pattern related information includes one or any combination of the following information: mobility pattern capability information, service feature information, and historical mobility event statistics information.

The mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location.

Step 502: The RAN node determines the mobility pattern of the terminal based on the received mobility pattern related information of the terminal.

The mobility pattern includes at least one of the following mobility management configuration information: a connection status, a location area list, a location update timer, or paging area mobility management configuration information.

Specifically, the RAN node determines, based on the mobility pattern capability information of the terminal, the mobility pattern supported by the terminal. Then, the RAN node selects, based on the historical mobility event statistics information of the terminal, at least one mobility pattern from the mobility pattern that can be supported by the terminal, or the RAN node selects, based on the service feature information of the terminal, at least one mobility pattern from the mobility pattern that can be supported by the terminal, or the RAN node selects, based on the service feature information and the historical mobility event statistics information of the terminal, at least one mobility pattern from the mobility pattern that can be supported by the terminal. The RAN node determines the mobility pattern of the terminal based on the selected at least one mobility pattern.

Specifically, before determining the mobility pattern of the terminal based on the mobility pattern related information of the terminal, the RAN node preconfigures a mobility pattern set that can be supported by the RAN node. The mobility pattern set includes at least one mobility pattern and a pattern index value corresponding to each mobility pattern.

The RAN node determines, based on the mobility pattern capability information of the terminal, at least one mobility pattern that can be supported by the terminal from the mobility pattern set.

The RAN node selects, based on the historical mobility event statistics information of the terminal, a mobility pattern corresponding to the historical mobility event statistics information of the terminal from the at least one mobility pattern that can be supported by the terminal; or the RAN node selects, based on the service feature information of the terminal, a mobility pattern corresponding to the service feature information of the terminal from the at least one mobility pattern that can be supported by the terminal.

Step 503: The RAN node sends the determined mobility pattern to the terminal.

Specifically, the RAN node sends a pattern index value corresponding to the mobility pattern to the terminal; or the RAN node sends mobility pattern configuration information of the terminal included in the mobility pattern to the terminal.

Figure 6:
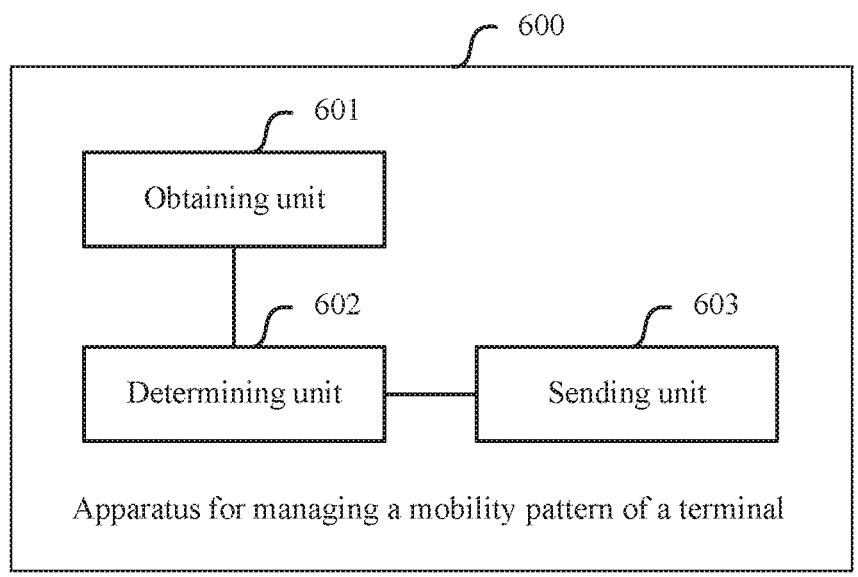
FIG. 6 is a first structural diagram of an apparatus for managing a mobility pattern of a terminal according to an embodiment of this application.

Based on a same inventive idea, referring to FIG. 6, an embodiment of this application further provides an apparatus 600 for managing a mobility pattern of a terminal, to perform the method for managing a mobility pattern of a terminal shown in FIG. 2. The apparatus 600 for managing a mobility pattern of a terminal includes an obtaining unit 601, a determining unit 602, and a sending unit 603.

The obtaining unit 601 is configured to obtain mobility pattern related information of a terminal.

The determining unit 602 is configured to determine a first mobility pattern of the terminal based on the mobility pattern related information of the terminal obtained by the obtaining unit 601.

The sending unit 603 is configured to send, to a radio access network (RAN) node, the first mobility pattern determined by the determining unit 602, where the first mobility pattern is used by the RAN node to determine a second mobility pattern of the terminal.

Optionally, the mobility pattern related information includes at least one of the following information: mobility pattern capability information, service feature information, or historical mobility event statistics information.

The mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location.

Optionally, the determining unit 602 is configured to:

determine, based on the mobility pattern capability information of the terminal, the mobility pattern that can be supported by the terminal;

select, based on the historical mobility event statistics information of the terminal, at least one mobility pattern from the mobility pattern that can be supported by the terminal, or select, based on the service feature information of the terminal, at least one mobility pattern from the mobility pattern that can be supported by the terminal, or select, based on the service feature information and the historical mobility event statistics information of the terminal, at least one mobility pattern from the mobility pattern that can be supported by the terminal; and determine a first mobility pattern of the terminal based on the selected at least one mobility pattern.

Optionally, both the first mobility pattern and the second mobility pattern include at least one of the following mobility management configuration information: a connection status, a location area list, a location update timer, or a paging area.

Optionally, the mobility pattern includes at least one of a signaling mobility pattern or a session mobility pattern.

The signaling mobility pattern includes a non-access stratum (NAS) signaling mobility pattern or a radio resource control (RRC) signaling mobility pattern.

Figure 7:
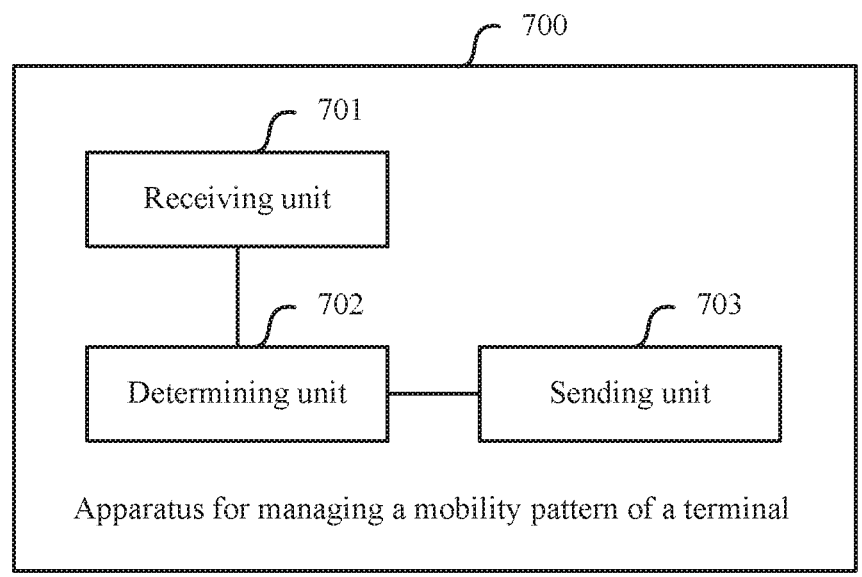
FIG. 7 is a second structural diagram of an apparatus for managing a mobility pattern of a terminal according to an embodiment of this application.

Based on a same inventive idea, referring to FIG. 7, an embodiment of this application further provides an apparatus 700 for managing a mobility pattern of a terminal, to perform the method for managing a mobility pattern of a terminal shown in FIG. 2. The apparatus 700 for managing a mobility pattern of a terminal includes a receiving unit 701, a determining unit 702, and a sending unit 703.

The receiving unit 701 is configured to receive a first mobility pattern of a terminal sent by a control plane function (CPF) entity.

The determining unit 702 is configured to determine a second mobility pattern of the terminal based on the first mobility pattern received by the receiving unit 701.

The sending unit 703 is configured to send, to the terminal, the second mobility pattern determined by the determining unit 702.

Optionally, the determining unit 702 is configured to:

pre-obtain a mobility pattern that can be supported by the apparatus; and determine the first mobility pattern as the second mobility pattern if the apparatus can support mobility management configuration information included in the first mobility pattern; or select a default mobility pattern as the second mobility pattern if the apparatus does not support mobility management configuration information included in the first mobility pattern.

Optionally, both the first mobility pattern and the second mobility pattern include at least one of the following mobility management configuration information: a connection status, a location area list, a location update timer, or a paging area.

Optionally, the connection status includes at least one of a signaling connection status and a session connection status.

The signaling connection status includes a non-access stratum (NAS) signaling connection status or a radio resource control (RRC) signaling connection status.

Figure 8:
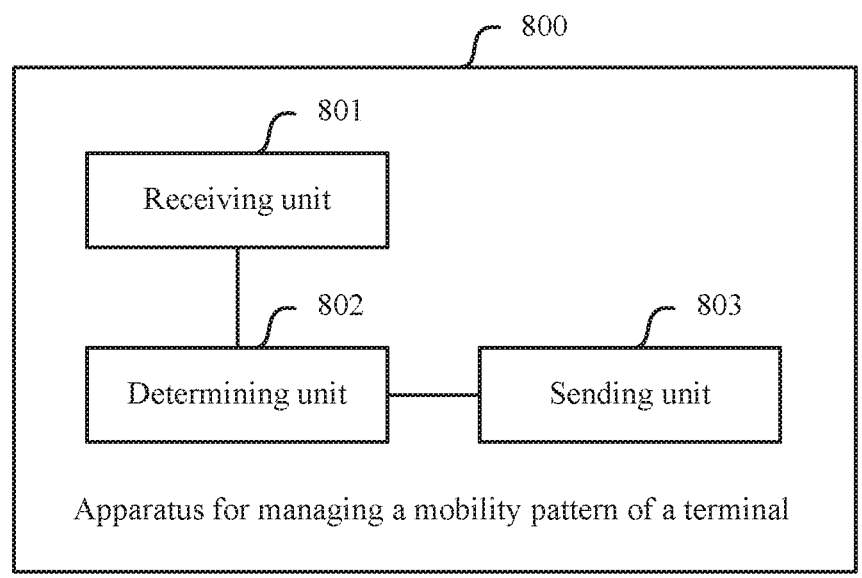
FIG. 8 is a third structural diagram of an apparatus for managing a mobility pattern of a terminal according to an embodiment of this application.

Based on a same inventive idea, referring to FIG. 8, an embodiment of this application further provides another apparatus 800 for managing a mobility pattern of a terminal, to perform the method for managing a mobility pattern of a terminal shown in FIG. 5. The apparatus 800 for managing a mobility pattern of a terminal includes a receiving unit 801, a determining unit 802, and a sending unit 803.

The receiving unit 801 is configured to receive mobility pattern related information of a terminal sent by a control plane function (CPF) entity.

The determining unit 802 is configured to determine a mobility pattern of the terminal based on the mobility pattern related information received by the receiving unit 801.

The sending unit 803 is configured to send, to the terminal, the mobility pattern determined by the determining unit 802.

Optionally, the mobility pattern related information includes at least one of the following information: mobility pattern capability information, service feature information, or historical mobility event statistics information.

The mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location.

Optionally, the determining unit 802 is configured to:

determine, based on the mobility pattern capability information of the terminal, the mobility pattern supported by the terminal;

select, based on the historical mobility event statistics information of the terminal, at least one mobility pattern from the mobility pattern that can be supported by the terminal, or select, based on the service feature information of the terminal, at least one mobility pattern from the mobility pattern that can be supported by the terminal, or select, based on the service feature information and the historical mobility event statistics information of the terminal, at least one mobility pattern from the mobility pattern that can be supported by the terminal; and determine the mobility pattern of the terminal based on the selected at least one mobility pattern.

Optionally, the mobility pattern includes at least one of the following mobility management configuration information: a connection status, a location area list, a location update timer, or a paging area.

Optionally, the connection status includes at least one of a signaling connection status and a session connection status.

The signaling connection status includes a non-access stratum (NAS) signaling connection status or a radio resource control (RRC) signaling connection status.

Figure 9:
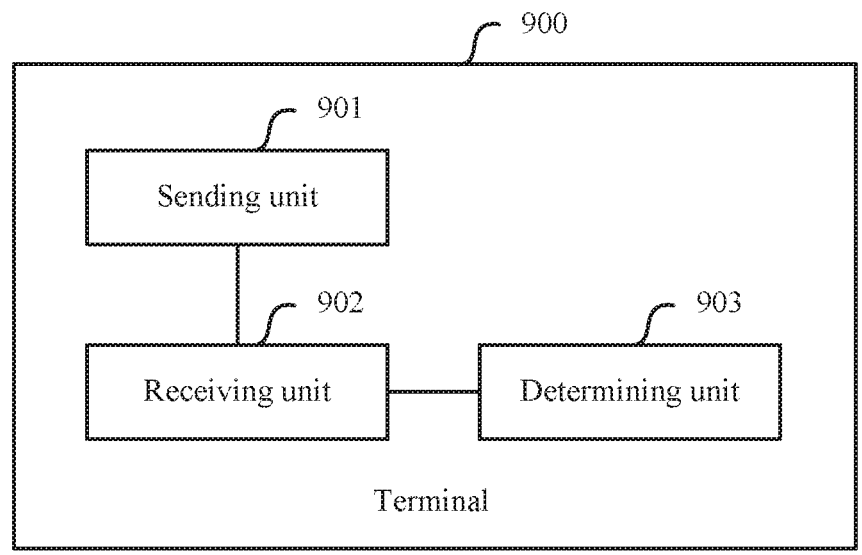
FIG. 9 is a first structural diagram of a terminal according to an embodiment of this application.

Based on a same inventive idea, referring to FIG. 9, an embodiment of this application further provides a terminal 900, to perform the method for managing a mobility pattern of a terminal shown in FIG. 2. The terminal 900 includes a sending unit 901, a receiving unit 902, and a determining unit 903.

The sending unit 901 is configured to send mobility pattern related information of the terminal to a control plane function (CPF) entity. The mobility pattern related information is used to determine a first mobility pattern of the terminal.

The receiving unit 902 is configured to receive a second mobility pattern sent by a RAN node.

The determining unit 903 is configured to determine, based on at least one mobility pattern included in the second mobility pattern, a mobility pattern used by the terminal.

Optionally, the mobility pattern related information includes at least one of the following information: mobility pattern capability information, service feature information, or historical mobility event statistics information.

The mobility pattern capability information includes a mobility pattern that can be supported by the terminal, the service feature information includes at least one of a periodic service indication of the terminal, duration of single service communication of the terminal, or a service period of the terminal, and the historical mobility event statistics information includes handover or location update that occurs on the terminal in a particular time segment, or the historical mobility event statistics information includes handover or location update that occurs at a particular location, or the historical mobility event statistics information includes a type of moving speed that occurs in a particular time segment or at a particular location.

Figure 10:
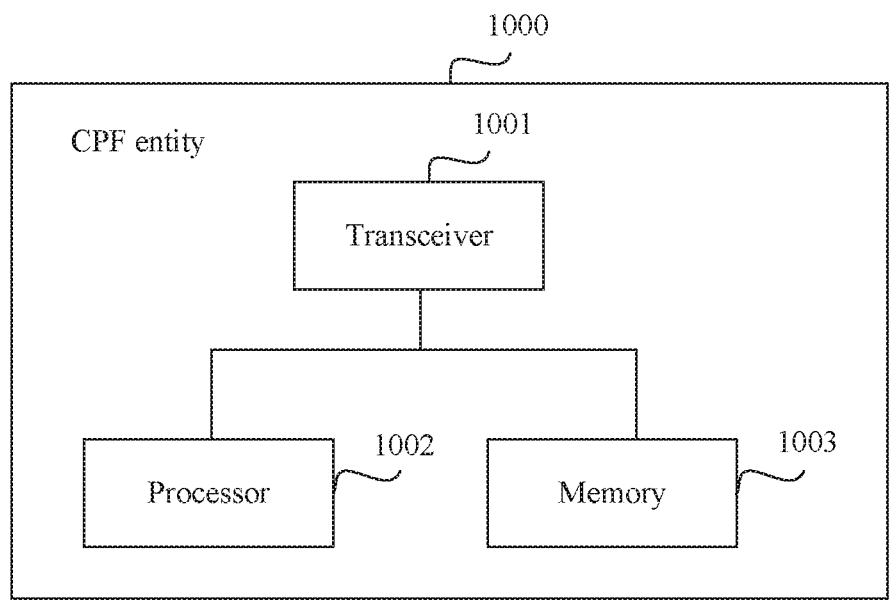
FIG. 10 is a structural diagram of a CPF entity according to an embodiment of this application.

Based on a same inventive idea, referring to FIG. 10, an embodiment of this application further provides a CPF entity 1000, including a transceiver 1001, a processor 1002, and a memory 1003. The memory 1003 is configured to store a set of programs. The processor 1002 is configured to invoke the programs stored in the memory 1003, to perform the method for managing a mobility pattern of a terminal shown in FIG. 2.

The processor 1002 may be a central processing unit (CPU), a network processor (NP), or a combination of a CPU and an NP.

The processor 1002 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) device, or any combination thereof.

The memory 1003 may include a volatile memory, for example, a random-access memory (RAM). Alternatively, the memory 1003 may include a non-volatile memory, for example, a flash memory, a hard disk drive (HDD), or a solid state disk (SSD). Alternatively, the memory 1003 may include a combination of the foregoing types of memories.

Figure 11:
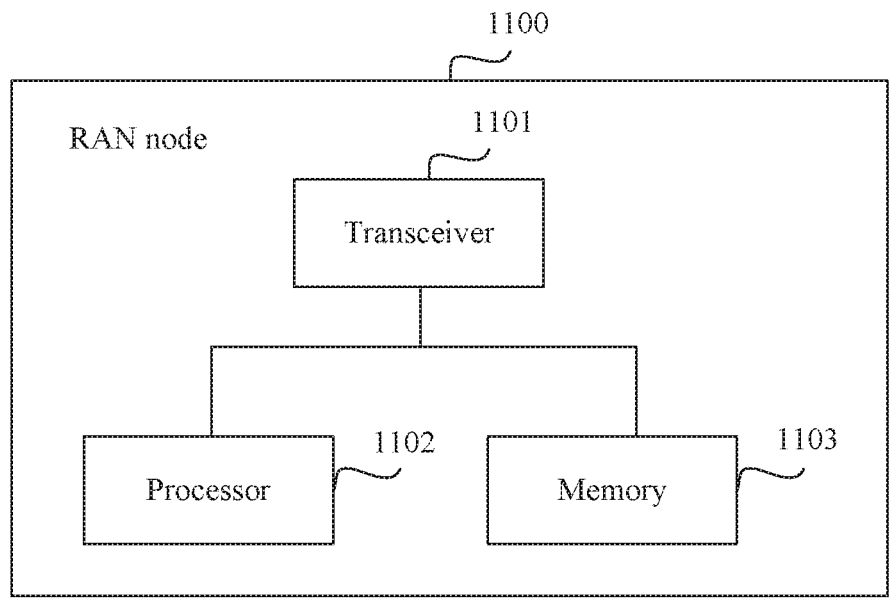
FIG. 11 is a first structural diagram of a RAN node according to an embodiment of this application.

Based on a same inventive idea, referring to FIG. 11, an embodiment of this application further provides a RAN node 1100, including a transceiver 1101, a processor 1102, and a memory 1103. The memory 1103 is configured to store a set of programs. The processor 1102 is configured to invoke the programs stored in the memory 1103, to perform the method for managing a mobility pattern of a terminal shown in FIG. 2.

The processor 1102 may be a CPU for short, a NP, or a combination of a CPU and an NP.

The processor 1102 may further include a hardware chip. The hardware chip may be an ASIC, a PLD, or a combination thereof. The PLD may be a CPLD, a FPGA, a GAL device, or any combination thereof.

The memory 1103 may include a volatile memory, for example, a RAM. Alternatively, the memory 1103 may include a non-volatile memory, for example, a flash memory, an HDD, or a SSD. Alternatively, the memory 1103 may include a combination of the foregoing types of memories.

Figure 12:
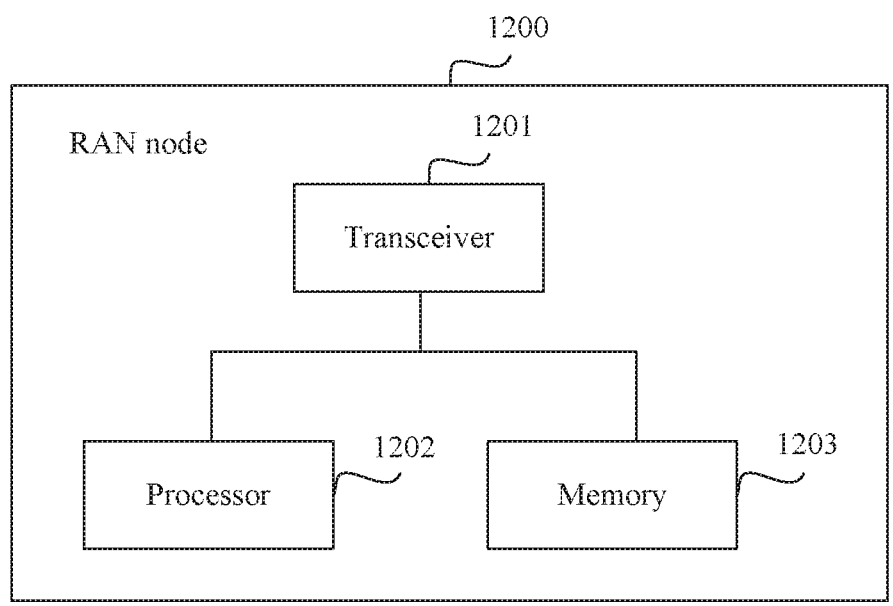
FIG. 12 is a second structural diagram of a RAN node according to an embodiment of this application.

Based on a same inventive idea, referring to FIG. 12, an embodiment of this application further provides another RAN node 1200, including a transceiver 1201, a processor 1202, and a memory 1203. The memory 1203 is configured to store a set of programs. The processor 1202 is configured to invoke the programs stored in the memory 1203, to perform the method for managing a mobility pattern of a terminal shown in FIG. 5.

The processor 1202 may be a CPU, a NP, or a combination of a CPU and an NP.

The processor 1202 may further include a hardware chip. The hardware chip may be an ASIC, a PLD, or a combination thereof. The PLD may be a CPLD, a FPGA, a GAL device, or any combination thereof.

The memory 1203 may include a volatile memory, for example, a RAM. Alternatively, the memory 1203 may include a non-volatile memory, for example, a flash memory, an HDD, or a SSD. Alternatively, the memory 1203 may include a combination of the foregoing types of memories.

Figure 13:
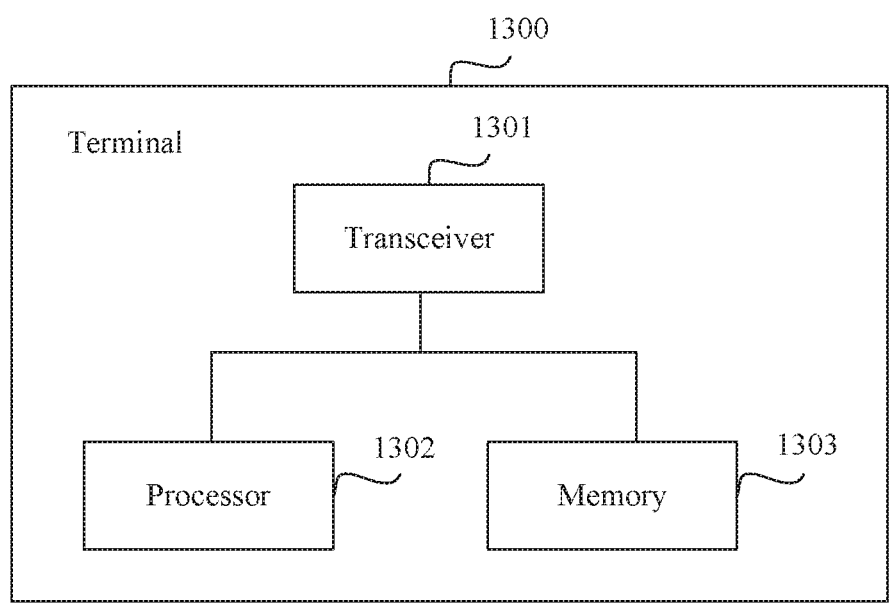
FIG. 13 is a second structural diagram of a terminal according to an embodiment of this application.

Based on a same inventive idea, referring to FIG. 13, an embodiment of this application further provides another terminal 1300, including a transceiver 1301, a processor 1302, and a memory 1303. The memory 1303 is configured to store a set of programs. The processor 1302 is configured to invoke the programs stored in the memory 1303, to perform the method for managing a mobility pattern of a terminal shown in FIG. 2.

The processor 1302 may be a CPU, a NP, or a combination of a CPU and an NP.

The processor 1302 may further include a hardware chip. The hardware chip may be an ASIC, a PLD, or a combination thereof. The PLD may be a CPLD, a FPGA, a GAL device, or any combination thereof.

The memory 1303 may include a volatile memory, for example, a RAM. Alternatively, the memory 1303 may include a non-volatile memory, for example, a flash memory, an HDD, or a SSD. Alternatively, the memory 1303 may include a combination of the foregoing types of memories.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Obviously, a person skilled in the art can make various modifications and variations to the embodiments of this application without departing from the spirit and scope of the embodiments of the present disclosure. This application is intended to cover these modifications and variations provided that they fall within the scope of protection defined by the following claims and their equivalent technologies.

What is claimed is:

1. A method comprising:
   receiving, by a radio access network (RAN) node, a first mobility pattern of a terminal from a control plane function (CPF) entity having a mobility management function and being of a core network node, the core network node being accessible by the terminal through the RAN node, wherein the first mobility pattern comprises a first mobility management configuration, the first mobility management configuration comprising a first location update timer for triggering acquisition of updated location of the terminal;
   configuring, by the RAN node, a RRC-INACTIVE state for the terminal based on the first mobility management configuration comprising the first location update timer received from the CPF; and
   sending, by the RAN node, a second mobility pattern including the RRC-INACTIVE state to the terminal; and
   wherein the method further comprises:
   determining, by the RAN node based on the first mobility pattern and a local configuration policy, the second mobility pattern in response to the RAN node not supporting the first mobility management configuration comprised in the first mobility pattern.

2. The method according to claim 1, wherein the method further comprises:
   sending, by the CPF entity, the first mobility pattern to the RAN node.

3. The method according to claim 2, wherein the method further comprises:
   obtaining, by the CPF entity, mobility pattern related information of the terminal; and
   determining, by the CPF entity, the first mobility pattern of the terminal based on the mobility pattern related information of the terminal.

4. The method according to claim 3, wherein:
   the mobility pattern related information comprises at least one of following information: mobility pattern capability information, service feature information, or historical mobility event statistics information;
   the mobility pattern capability information comprises a mobility pattern supported by the terminal;
   the service feature information comprises at least one of a periodic service indication of the terminal, duration of single service communication of the terminal, or a service period of the terminal; and
   the historical mobility event statistics information comprises handover or location update that occurs on the terminal in a particular time segment, or the historical mobility event statistics information comprises handover or location update that occurs at a particular location, or the historical mobility event statistics information comprises a type of moving speed that occurs in a particular time segment or at a particular location.

5. The method according to claim 4, wherein the method further comprises:
   determining, by the CPF entity based on the mobility pattern capability information of the terminal, one or more mobility patterns supported by the terminal; and
   selecting, by the CPF entity based on the historical mobility event statistics information of the terminal, a mobility pattern from the one or more mobility patterns supported by the terminal, or
   selecting, by the CPF entity based on the service feature information of the terminal, a mobility pattern from the one or more mobility patterns supported by the terminal, or
   selecting, by the CPF entity based on the service feature information and the historical mobility event statistics information of the terminal, a mobility pattern from the one or more mobility pattern supported by the terminal.

6. The method according to claim 1, further comprising:
   determining, by the RAN node, the second mobility pattern of the terminal based on the first mobility pattern received from the CPF and based on whether the RAN node supports the first mobility pattern.

7. The method according to claim 1, wherein the second mobility pattern further comprises a location area list configured for the terminal, or a second location update timer, the location area list or the second location update timer determined based on the first mobility pattern received.

8. An apparatus comprising:
   a processor; and
   a non-transitory memory configured to store a program that, when executed by the processor, causes the apparatus to:
   receive a first mobility pattern of a terminal from a control plane function (CPF) entity having a mobility management function and being of a core network node, the core network node being accessible by the terminal through the apparatus, wherein the first mobility pattern comprises a first mobility management configuration, the first mobility management configuration comprising a first location update timer for triggering acquisition of updated location of the terminal, configure a RRC-INACTIVE state for the terminal based on the first mobility management configuration comprising the first location update timer received from the CPF, and send a second mobility pattern including the RRC-INACTIVE state to the terminal; and wherein the program, when executed by the processor, causes the apparatus further to:

determine, based on the first mobility pattern and a local configuration policy, the second mobility pattern in response to the apparatus not supporting the first mobility management configuration comprised in the first mobility pattern.

9. The apparatus according to claim 8, wherein the program, when executed by the processor, causes the apparatus further to perform:

determining the second mobility pattern of the terminal based on the first mobility pattern received from the CPF and based on whether the apparatus supports the first mobility pattern.

10. The apparatus according to claim 8, wherein the second mobility pattern further comprises a location area list configured for the terminal, or a second location update timer, the location area list or the second location update timer determined based on the first mobility pattern received.

11. A communication system, comprising: a radio access network (RAN) node, and a control plane function (CPF) entity having a mobility management function and being of a core network node, the core network node being accessible by terminals through the RAN node; wherein the CPF entity is configured to send a first mobility pattern of a terminal to the RAN node, wherein the first mobility pattern comprises a first mobility management configuration, the first mobility management configuration comprising a first location update timer for triggering acquisition of updated location of the terminal; and the RAN node is configured to configure a RRC-INACTIVE state for the terminal based on the first mobility management configuration comprising the first location update timer received from the CPF, and send a second mobility pattern including the RRC-INACTIVE state to the terminal, and wherein the RAN node is further configured to determine, based on the first mobility pattern and a local configuration policy, the second mobility pattern in response to the RAN node not supporting the first mobility management configuration comprised in the first mobility pattern.

12. The system according to claim 11, wherein the CPF entity is further configured to:

obtain mobility pattern related information of the terminal; and determine the first mobility pattern of the terminal based on the mobility pattern related information of the terminal.

13. The system according to claim 12, wherein:

the mobility pattern related information comprises at least one of following information: mobility pattern capability information, service feature information, or historical mobility event statistics information;

the mobility pattern capability information comprises a mobility pattern supported by the terminal;

the service feature information comprises at least one of a periodic service indication of the terminal, duration of single service communication of the terminal, or a service period of the terminal; and the historical mobility event statistics information comprises handover or location update that occurs on the terminal in a particular time segment, or the historical mobility event statistics information comprises handover or location update that occurs at a particular location, or the historical mobility event statistics information comprises a type of moving speed that occurs in a particular time segment or at a particular location.

14. The system according to claim 13, wherein the CPF entity is further configured to:

determine, based on the mobility pattern capability information of the terminal, one or more mobility patterns supported by the terminal; and select, based on the historical mobility event statistics information of the terminal, a mobility pattern from the one or more mobility patterns supported by the terminal, or select, based on the service feature information of the terminal, a mobility pattern from the one or more mobility patterns supported by the terminal, or select, based on the service feature information and the historical mobility event statistics information of the terminal, a mobility pattern from the one or more mobility pattern supported by the terminal.

15. The system according to claim 11, wherein the RAN node is configured to:

determine the second mobility pattern of the terminal based on the first mobility pattern received from the CPF and based on whether the RAN node supports the first mobility pattern.

16. The system according to claim 11, wherein the second mobility pattern further comprises a location area list configured for the terminal, or a second location update timer, the location area list or the second location update timer determined based on the first mobility pattern received.

* * * * *

UNITED STATES PATENT AND TRADEMARK OFFICE
CERTIFICATE OF CORRECTION

PATENT NO. : 11,533,606 B2
APPLICATION NO. : 16/283324
DATED : December 20, 2022
INVENTOR(S) : Huang et al.

It is certified that error appears in the above-identified patent and that said Letters Patent is hereby corrected as shown below:

In the Specification

Column 1, Lines 12-13; delete "HELD" and insert --FIELD--.

In the Summary, Column 3, Line 7; delete "patter" and insert --pattern--.

Signed and Sealed this
Seventh Day of February, 2023

Katherine Kelly Vidal
*Director of the United States Patent and Trademark Office*